(12) United States Patent
Yamakami et al.

(10) Patent No.: US 9,195,003 B2
(45) Date of Patent: Nov. 24, 2015

(54) OPTICAL UNIT IN WHICH OPTICAL ELEMENT IS MOUNTED ON BASE HAVING OPTICAL WAVE GUIDE AND METHOD OF MANUFACTURING THE SAME

(71) Applicant: FUJITSU LIMITED, Kawasaki-shi, Kanagawa (JP)

(72) Inventors: Takatoyo Yamakami, Nagano (JP); Takashi Kubota, Chikuma (JP); Masayuki Kitajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 13/952,780

(22) Filed: Jul. 29, 2013

(65) Prior Publication Data
US 2014/0086525 A1  Mar. 27, 2014

(30) Foreign Application Priority Data
Sep. 21, 2012  (JP) ................. 2012-208766

(51) Int. Cl.
*G02B 6/00* (2006.01)
*G02B 6/43* (2006.01)
*G02B 6/12* (2006.01)
*G02B 6/42* (2006.01)
*G02B 6/138* (2006.01)

(52) U.S. Cl.
CPC *G02B 6/12* (2013.01); *G02B 6/138* (2013.01); *G02B 6/4214* (2013.01); *G02B 6/43* (2013.01); *Y10T 29/49124* (2015.01)

(58) Field of Classification Search
CPC .......................................... G02B 6/00
USPC .......................................... 385/14
See application file for complete search history.

(56) References Cited

U.S. PATENT DOCUMENTS

| 5,737,469 A * | 4/1998 | Costello et al. ......... 385/109 |
| 2004/0091221 A1 * | 5/2004 | Debban et al. ......... 385/114 |
| 2009/0311734 A1 | 12/2009 | Greve et al. |
| 2011/0286706 A1 * | 11/2011 | Greenwood et al. ...... 385/107 |
| 2012/0051702 A1 * | 3/2012 | Blazer et al. .......... 385/113 |

FOREIGN PATENT DOCUMENTS

| JP | 2004-179578 | | 6/2004 |
| JP | 2009186666 A | * | 8/2009 |
| JP | 2009-537021 | | 10/2009 |
| JP | 2011-096755 | | 5/2011 |

* cited by examiner

*Primary Examiner* — Akm Enayet Ullah
(74) *Attorney, Agent, or Firm* — Fujitsu Patent Center

(57) ABSTRACT

An optical unit in which an optical part having an optical element is mounted on a base having an optical waveguide includes a hydrophobic first area formed in a region including an optical axis of the optical part, a hydrophobic second area formed in a region facing the first area on a surface of the base, and a hydrophilic filler which fills peripheries of the first area and the second area between the optical part and the base.

13 Claims, 12 Drawing Sheets

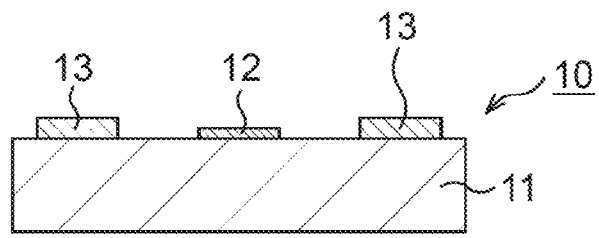
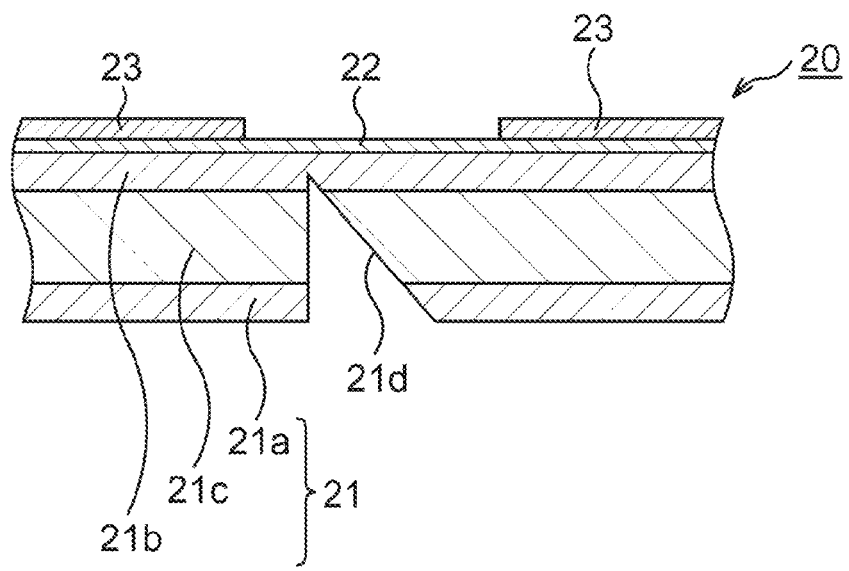
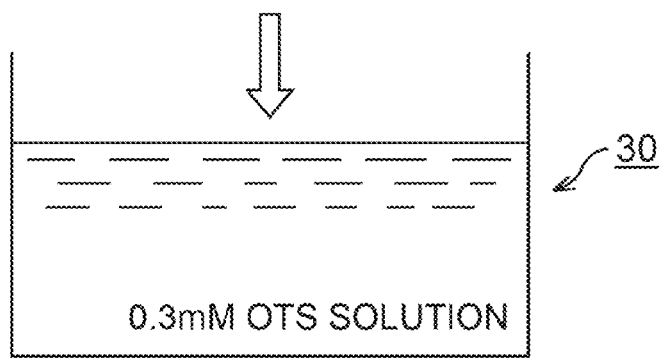

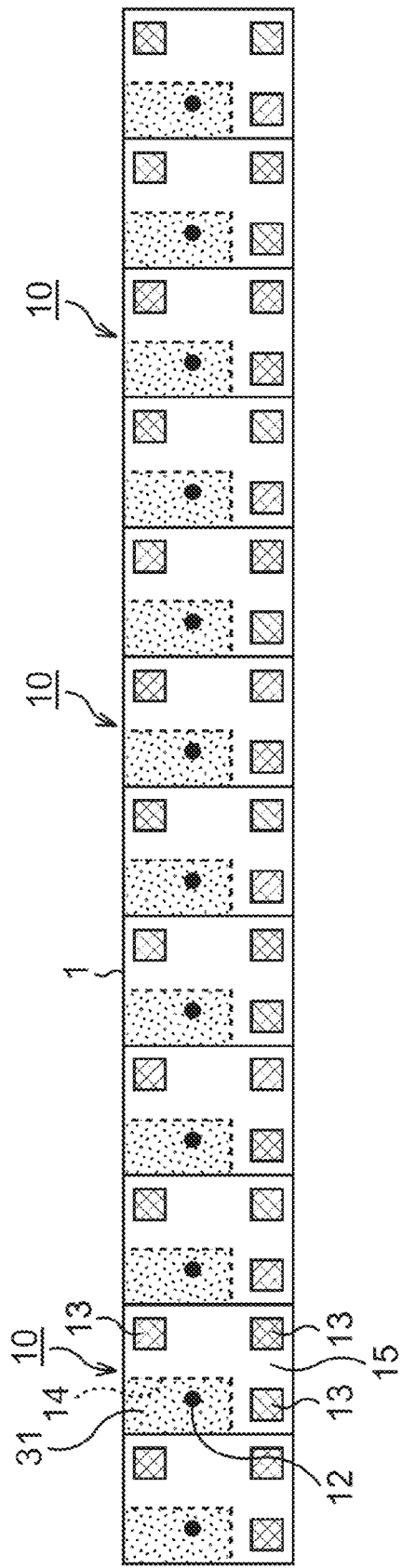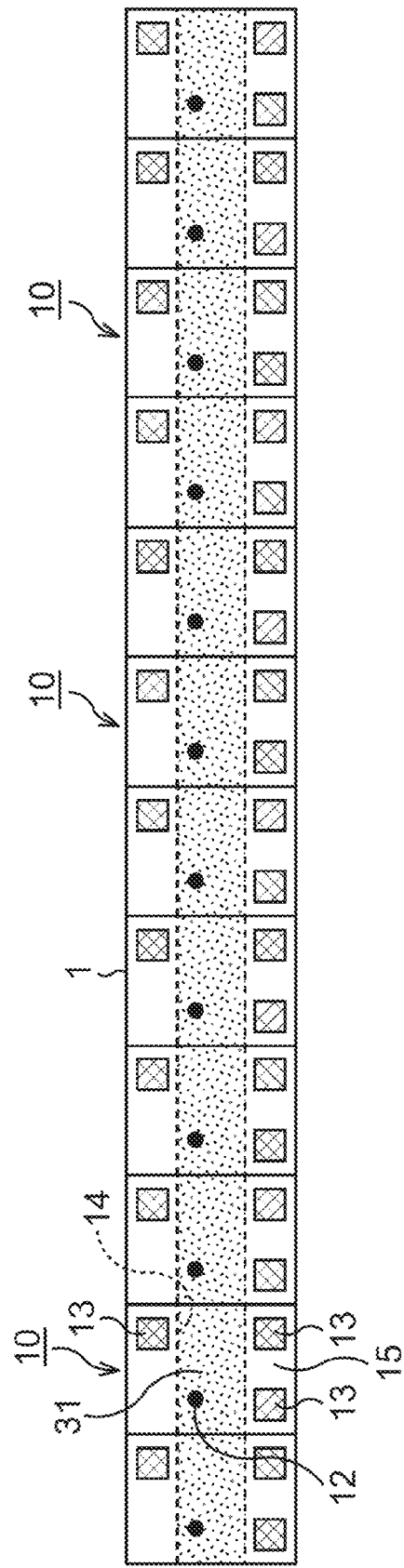

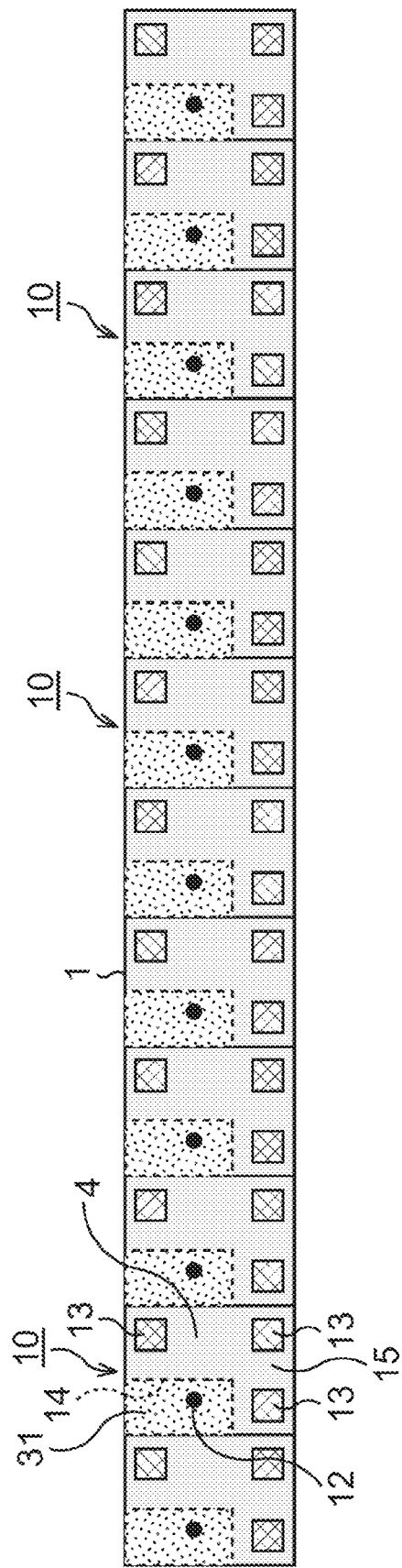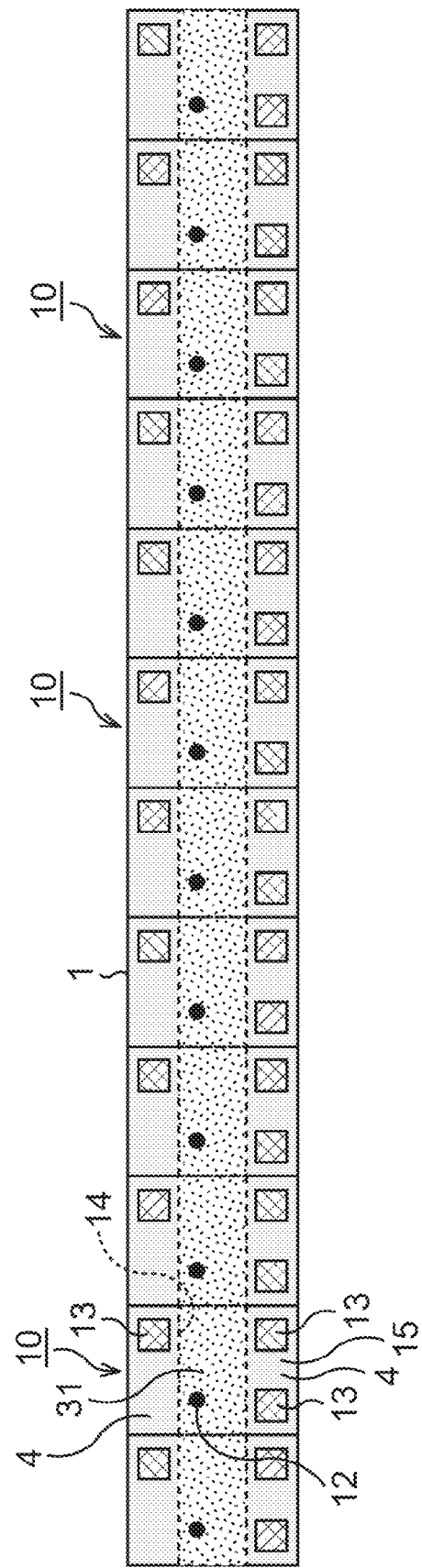

OPTICAL UNIT IN WHICH OPTICAL ELEMENT IS MOUNTED ON BASE HAVING OPTICAL WAVE GUIDE AND METHOD OF MANUFACTURING THE SAME

CROSS-REFERENCE TO RELATED APPLICATION

This application is based upon and claims the benefit of priority of the prior Japanese Patent Application No. 2012-208766, filed on Sep. 21, 2012, the entire contents of which are incorporated herein by reference.

FIELD

The embodiments discussed herein are directed to an optical unit in which an optical element is mounted on a base having an optical waveguide, and to a method of manufacturing the same.

BACKGROUND

In late years, what is called optical wiring is gaining attention, which can be expected to have effects in power consumption, transmission distance, transmission speed, degree of freedom in design (communication specifications, wiring layouts, electromagnetic noise), wiring space, and the like. Utilization of the optical wiring to super computers, high-performance servers, mobile phones, and the like is considered.

As an optical unit used for the optical wiring, there is used a structure to face-down mount an optical element (VCSEL/PD) or an optical module (optical part) incorporating an optical element and a control IC (Driver/AMP) on a base having an optical waveguide sheet. In this optical unit, it is necessary that a mirror formed in the optical waveguide sheet and the optical axis of a light emitting part or a light receiving part of the optical part are coupled with high accuracy and electrically joined to electrical wirings.

When the optical part is face-down mounted on a base, an underfill material is filled and sealed between the optical part and the base. In this case, a transparent material with high light transmittance is used as the underfill material in order to obtain optical coupling between the optical part and the optical waveguide sheet of the base.

Patent Document 1: Japanese Laid-open Patent Publication No. 2011-96755
Patent Document 2: Japanese Laid-open Patent Publication No. 2004-179578

It is desired for the underfill material used in the optical unit to satisfy both suppression of optical coupling loss due to optical absorption, scattering, mixing in of foreign objects, and the like, and acquisition of joint reliability in the electrically joined region between the optical part and the base. However, in order to obtain excellent optical coupling, high transparency (for example, transmittance ≥about 90%) is needed in the underfill material, and thus there are constraints that the filler cannot be contained in the underfill material, and the like. Thus, there arises a problem that the joint reliability of the electrically joined region cannot be acquired.

To address this problem, there has been proposed a method of filling so that an area including the optical axis of the optical part between the optical part and the base becomes a gap by using an underfill material of high-viscosity resin. In this case, there are a method to fix the side face of an optical part mounted on a base, a method to fix four corners of the optical part, and the like. However, in this case, it is difficult to securely cover the electrically joined region between the optical part and the base with the underfill material, and there occur problems that the electrically joined region is exposed, that entrance of the underfill material into the gap cannot be suppressed, and the like.

There has also been considered filling so that the area including the optical axis of the optical part between the optical part and the base becomes a gap by using an underfill material in a sheet form. However, in this case, it is difficult to adequately deal with a minute optical part, and there occurs a problem that the gap cannot be controlled to be a desired state.

SUMMARY

One aspect of an optical unit is an optical unit in which an optical part is mounted on a base having an optical waveguide, the optical unit including a hydrophobic first area formed in a region including an optical axis of the optical part, a hydrophobic second area formed in a region facing the first area on a surface of the base, and a hydrophilic filler which fills peripheries of the first area and the second area between the optical part and the base.

One aspect of a method of manufacturing an optical unit is a method of manufacturing an optical unit in which an optical part is mounted on a base having an optical waveguide, the method including forming a hydrophobic first area in a region including an optical axis of the optical part and a hydrophobic second area in a region facing the first area on a surface of the base, mounting the optical part on the base so that the first area and the second area face each other, and filling a hydrophilic filler between the optical part and the base.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A and FIG. 1B are schematic cross-sectional views illustrating a method of manufacturing an optical unit according to a first embodiment;

FIG. 2 is a schematic view illustrating a solution tank used for manufacturing the optical unit according to the first embodiment;

FIG. 7A and FIG. 7B are schematic plan views illustrating the method of manufacturing the optical unit according to the first embodiment;

FIG. 11A and FIG. 11B are schematic plan views illustrating the method of manufacturing the optical unit according to the first embodiment;

DESCRIPTION OF EMBODIMENTS

Figure 3A:
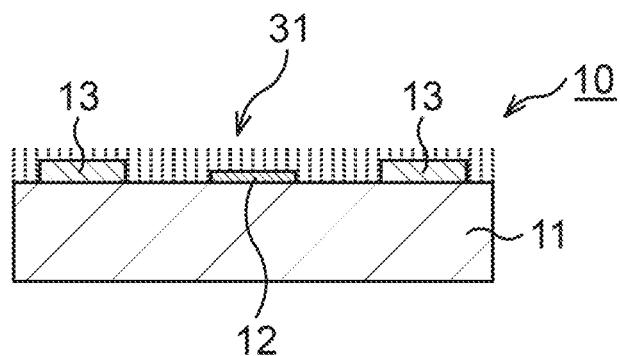
FIG. 3A and FIG. 3B are schematic cross-sectional views illustrating the method of manufacturing the optical unit according to the first embodiment.

Hereinafter, specific embodiments of an optical unit and a method of manufacturing the same will be explained in detail with reference to the drawings.

First Embodiment

In this embodiment, a structure of an optical unit will be described together with a method of manufacturing the same.

FIG. 1A to FIG. 11B are schematic diagrams illustrating a method of manufacturing an optical unit according to a first embodiment.

As illustrated in FIG. 1A, an optical module (optical part) 10 is prepared.

The optical part 10 has a substrate 11 of, for example, Si or the like, on which are provided an optical element 12, which is a surface emitting type semiconductor laser (VCSEL) or a surface receiving type photodetector (PD), and a plurality of connecting electrodes 13 as first connecting parts, which are connecting pads to an external part, electrically connected to the optical element 12.

As illustrated in FIG. 1B, a base 20 is prepared.

In the base 20, a protective layer 22 such as a polyimide is formed on an optical waveguide sheet 21, and a plurality of electrical wirings 23 as second connecting parts are formed on the protective layer 22.

The optical waveguide sheet 21 is formed by sandwiching a core layer 21c with clad layers 21a, 21b, and a V-shaped trench 21d is formed on a lower face side thereof by cutting using a dicer or the like. The V-shaped trench 21d functions as a mirror reflecting light emitted from the optical element 12 and guiding the light to a core layer 21c, or reflecting light which passed through the core layer 21c and guiding the light to the optical element 12.

Subsequently, the surface of the optical part 10 and the surface of the base 20 are made to be hydrophobic. More specifically, a hydrophobic solution as illustrated in FIG. 2 is prepared. A solution tank 30 contains, as the hydrophobic solution, for example, an octadecyltrichlorosilane (OTS) solution of 0.3 mM with toluene being a solvent. This OTS solution is of the type having a refractive index of 1.459 by a D line (sodium vapor lamp) at 20° C.

In a dry room, under atmospheric pressure, each of the optical part 10 and the base 20 is dipped for about 30 minutes in the OTS solution in the solution tank 30. Thereafter, the optical part 10 and the base 20 are dried for about 24 hours in a nitrogen ($N_2$) box.

Figure 3B:
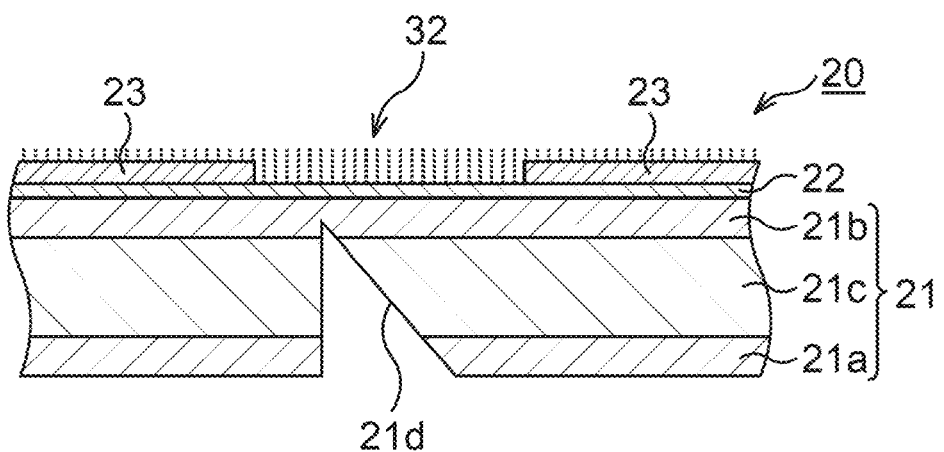

Thus, as illustrated in FIG. 3A, an octadecyl group (Si$(CH_2)17CH_3$), which is a hydrophobic group, is added to the entire surface of the optical part 10, thereby forming a hydrophobic film 31. Similarly, as illustrated in FIG. 3B, the octadecyl group, which is a hydrophobic group, is added to the entire surface of the base 20, thereby forming a hydrophobic film 32.

Subsequently, on the surface of the optical part 10, the hydrophobic film 31 is left on a portion including the optical element 12 and thereabove.

Figure 4A:
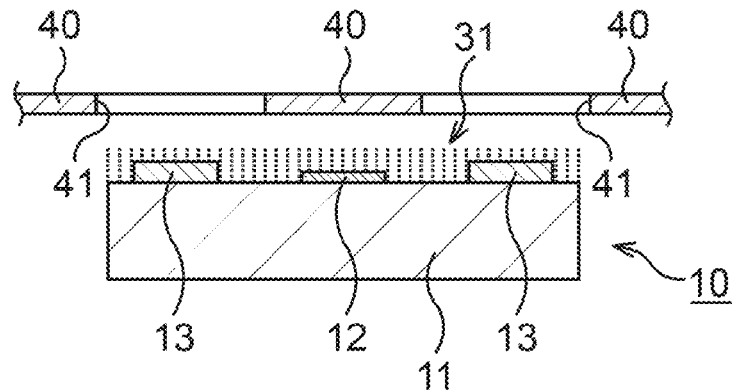
FIG. 4A to FIG. 4C are schematic cross-sectional views illustrating the method of manufacturing the optical unit according to the first embodiment.

More specifically, as illustrated in FIG. 4A, a photomask 40 having an opening 41 is prepared.

In the photomask 40, an opening 41 is formed in a substantially L shape when seen in a plan view. The photomask 40 is placed above the surface of the optical part 10. In the photomask 40, a portion including the plurality of connecting electrodes 13 and thereabove is exposed through the opening 41, and the portion including the optical element 12 and thereabove is in a state of being blocked by the photomask 40.

Figure 4B:
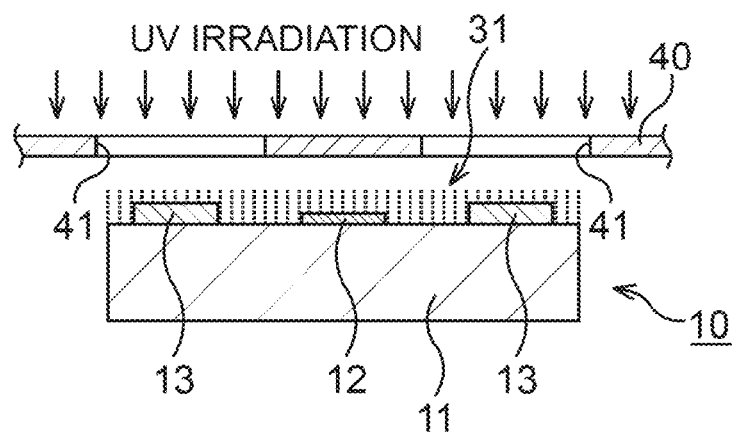

As illustrated in FIG. 4B, ultraviolet light is irradiated to the photomask 40. The irradiation energy of the ultraviolet light is adjusted to be 10 J/cm$^2$ or lower. With the photomask 40, the ultraviolet light is irradiated to the portion including the plurality of connecting electrodes 13 and thereabove (portion in a substantially L shape in a plan view) via the opening 41. By irradiation of the ultraviolet light, the octadecyl group, which is a hydrophobic group, is denatured to be a hydrophilic group (SiOH) in the portion of the hydrophobic film 31 which includes the plurality of connecting electrodes 13 and thereabove.

Figure 4C:
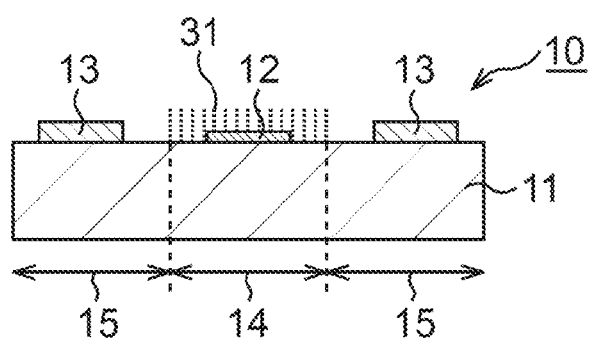

Thus, as illustrated in FIG. 4C, the hydrophobic film 31 is left on the portion including the optical element 12 and thereabove where the ultraviolet light is blocked, thereby forming a hydrophobic area 14 as a first area. On the other hand, in a portion surrounding the hydrophobic area 14, that is, the portion including the connecting electrodes 13 and thereabove where the ultraviolet light is irradiated, a hydrophilic area 15 is formed. The contact angle relative to water in the hydrophobic area 14 becomes 100° or more, thereby obtaining a sufficient hydrophobic property. The contact angle relative to water in the hydrophilic area 15 becomes 10° or less, thereby obtaining a sufficient hydrophilic property.

Subsequently, on the surface of the base 20, the hydrophobic film 32 is left in a portion including an optical axis to be made to face the optical element 12 and a portion above the electrical wirings 23.

Figure 5A:
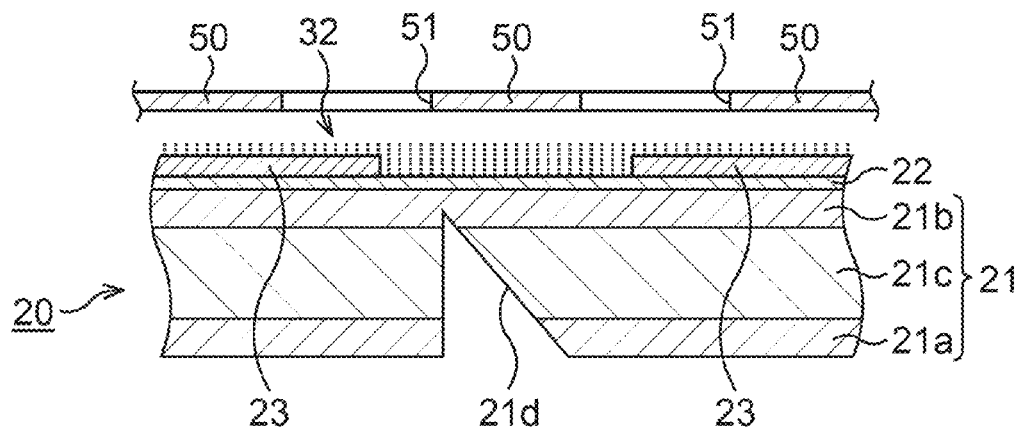
FIG. 5A to FIG. 5C are schematic cross-sectional views illustrating the method of manufacturing the optical unit according to the first embodiment.

More specifically, as illustrated in FIG. 5A, a photomask 50 having an opening 51 is prepared.

In the photomask 50, an opening 51 is formed in a substantially L shape when seen in a plan view. The photomask 50 is placed above the surface of the base 20. In the photomask 50, a portion including the plurality of electrical wirings 23 and thereabove is exposed through the opening 51, and the portion including the optical axis is in a state of being blocked by the photomask 50.

Figure 5B:
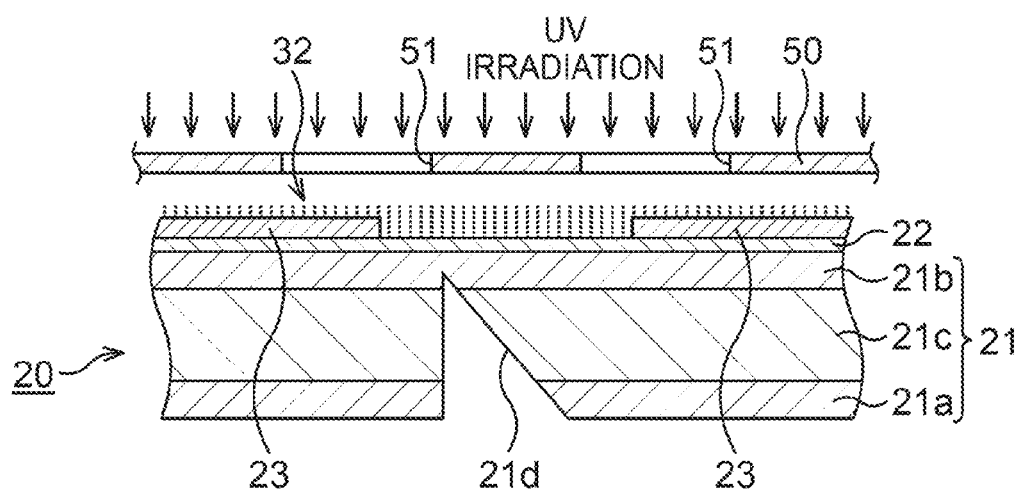

As illustrated in FIG. 5B, ultraviolet light is irradiated to the photomask 50. The irradiation energy of the ultraviolet light is adjusted to be 10 J/cm$^2$ or lower. With the photomask 50, the ultraviolet light is irradiated to the portion above the plurality of electrical wirings 23 (portion in a substantially L shape in a plan view) via the opening 51. By irradiation of the ultraviolet light, the octadecyl group, which is a hydrophobic group, is denatured to be a hydrophilic group (SiOH) in the portion of the hydrophobic film 32 above the electrical wirings 23.

Figure 5C:
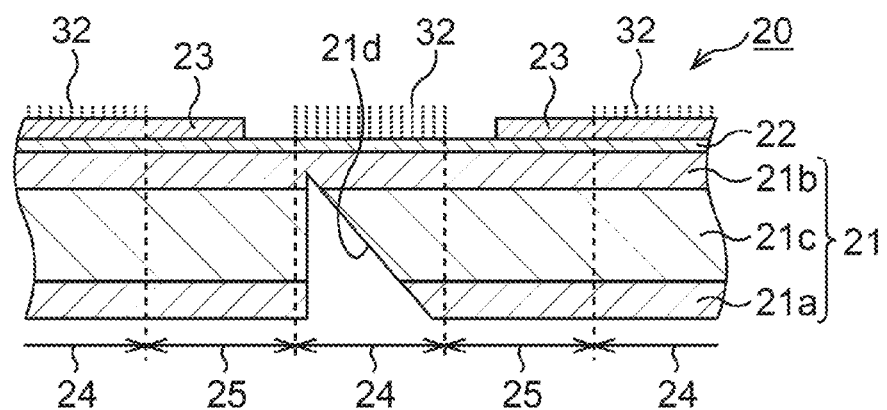

Thus, as illustrated in FIG. 5C, the hydrophobic film 32 is left on the portion including the optical axis where the ultraviolet light is blocked and the other portion above the electrical wirings 23, thereby forming a hydrophobic area 24 as a second area. On the other hand, in a portion surrounding the hydrophobic area 14, that is, the portion above the electrical wirings 23 where the ultraviolet light is irradiated, a hydrophilic area 25 is formed. The contact angle relative to water in the hydrophobic area 24 becomes 100° or more, thereby obtaining a sufficient hydrophobic property. The contact angle relative to water in the hydrophilic area 25 becomes 10° or less, thereby obtaining a sufficient hydrophilic property.

In this embodiment, it is possible to freely form the hydrophilic area 15 on the optical part 10. Thus, the hydrophobic area 14 in which the optical element 12 is covered with the hydrophobic film 31 can be formed at a desired position and in a desired shape.

Figure 6A:
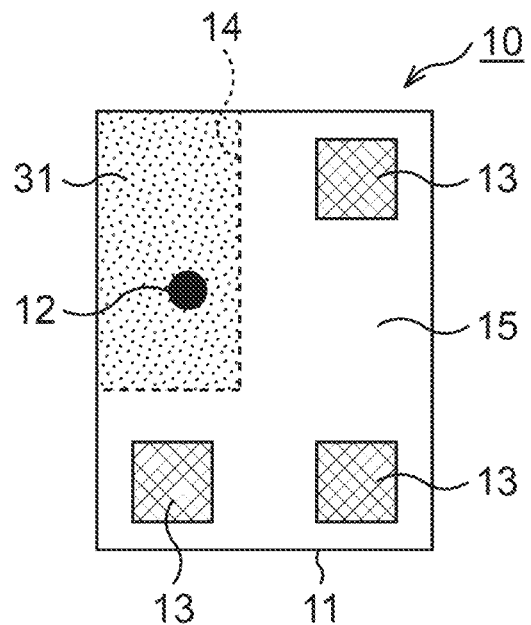
FIG. 6A and FIG. 6B are schematic plan views illustrating the method of manufacturing the optical unit according to the first embodiment.
Figure 6B:
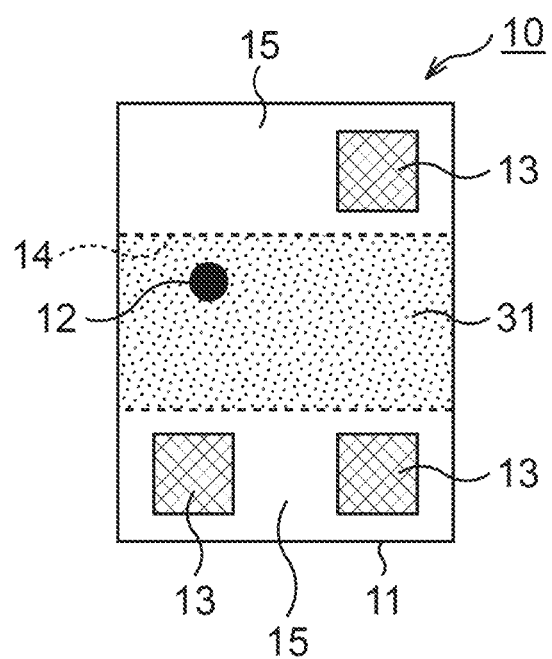

FIGS. 6A and 6B are schematic plan views illustrating a state that a hydrophobic area is formed in the optical part according to this embodiment. FIG. 6A illustrates a first example and FIG. 6B illustrates a second example.

In the first example illustrated in FIG. 6A, the substantially L-shaped hydrophilic area 15 is formed in the optical part 10, and thereby the hydrophobic area 14 including the optical element 12 and thereabove is formed. The hydrophilic area 15 is formed integrally in a substantially L-shaped island shape including the plurality of connecting electrodes 13. The hydrophobic area 14 is formed in a partially opened rectangular shape.

In the second example illustrated in FIG. 6B, the hydrophilic area 15 is formed in a center region in the optical part 10, and thereby the hydrophobic area 14 including the optical element 12 and thereabove is formed. With respect to the plurality of connecting electrodes 13, the hydrophilic area 15 is formed to be separated into an island-shaped region including connecting electrodes 13 (two in the illustrated example) on a lower side, and an island-shaped region including a connecting electrode 13 (one in the illustrated example) on an upper side. The hydrophobic area 14 is formed in a rectangular shape, which is opened at left and right ends.

FIGS. 6A and 6B illustrate the case where individual optical parts 10 are formed one by one, but there may be cases where a structure is employed in which plural, here 12, optical parts 10 are formed in parallel.

FIGS. 7A and 7B are schematic plan views illustrating a state that hydrophobic areas are formed on a base body on which a plurality of optical parts according to the present invention are formed. FIG. 7A illustrates a first example and FIG. 7B illustrates a second example.

In the first example illustrated in FIG. 7A, a plurality of optical parts 10 are formed in parallel on a longitudinally elongated base body 1 of Si for example. In each optical part 10, the substantially L-shaped hydrophilic area 15 is formed, and thereby the hydrophobic area 14 including the optical element 12 and thereabove is formed. The hydrophilic area 15 is formed integrally in a substantially L-shaped island shape including the plurality of connecting electrodes 13. The hydrophobic area 14 is formed in a rectangular shape, which is partially opened at an end in each optical part 10.

In the second example illustrated in FIG. 7B, a plurality of optical parts 10 are formed in parallel on a longitudinally elongated base body 1 of Si for example. In each optical part 10, the hydrophilic area 15 is formed in a center region, and thereby the hydrophobic area 14 including the optical element 12 and thereabove is formed. With respect to the plurality of connecting electrodes 13, the hydrophilic area 15 is formed to be separated into an island-shaped region including connecting electrodes 13 (two in the illustrated example) on a lower side, and an island-shaped region including a connecting electrode 13 (one in the illustrated example) on an upper side. The hydrophobic area 14 is formed in a rectangular shape, which is opened at left and right ends in each optical part 10.

Figure 8:
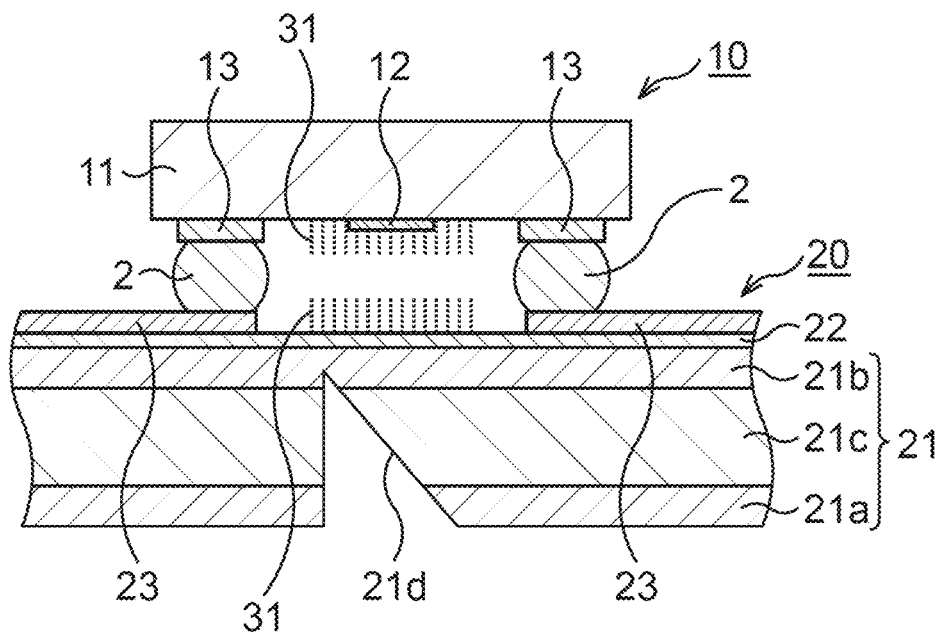
FIG. 8 is a schematic cross-sectional view illustrating the method of manufacturing the optical unit according to the first embodiment.

Subsequently, the optical part 10 is mounted on the base 20 as illustrated in FIG. 8.

More specifically, the surface of the optical part 10 and the surface of the base 20 are opposed to each other so that the hydrophobic area 14 and the hydrophobic area 24 face each other, and the connecting electrodes 13 and the electrical wirings 23 are electrically connected with bumps 2. Below the optical element 12, the V-shaped trench 21d of the optical waveguide sheet 21 of the base 20 is aligned in position.

Figure 9:
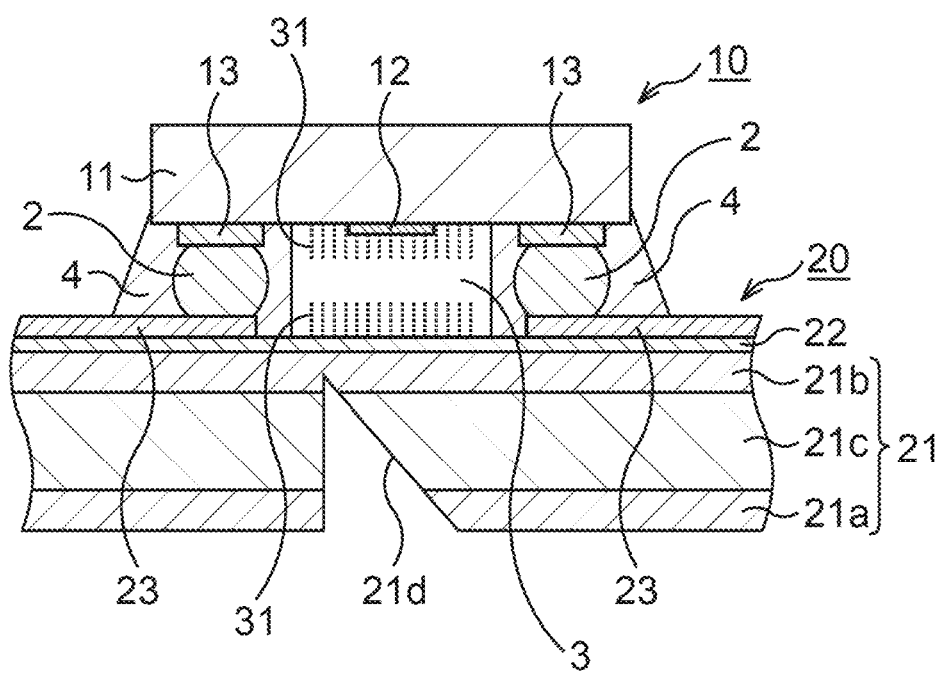
FIG. 9 is a schematic cross-sectional view illustrating the method of manufacturing the optical unit according to the first embodiment.

Subsequently, as illustrated in FIG. 9, an underfill material 4 as a filler is added between the optical part 10 and the base 20 which are joined.

More specifically, a hydrophilic underfill material 4 is filled between the optical part 10 and the base 20 which are joined. As the underfill material 4, it is not necessary to use one with high viscosity, and a product named FTC-LTD1 (made by Fujitsu Quality Laboratory LTD.) or the like with low viscosity of 50 cP or lower for example is used. At this time, the underfill material 4 is not added to the hydrophobic areas 14, 24, but is added only to the hydrophilic areas 15, 25 in a self-aligned manner, so as to fill the space between the optical part 10 and the base 20 which are joined. At this time, a gap 3 defined by the underfill material 4 is formed in a facing region between the hydrophobic area 14 and the hydrophobic area 24. The gap 3 is formed to include the optical axis of the optical element 12.

Figure 10A:
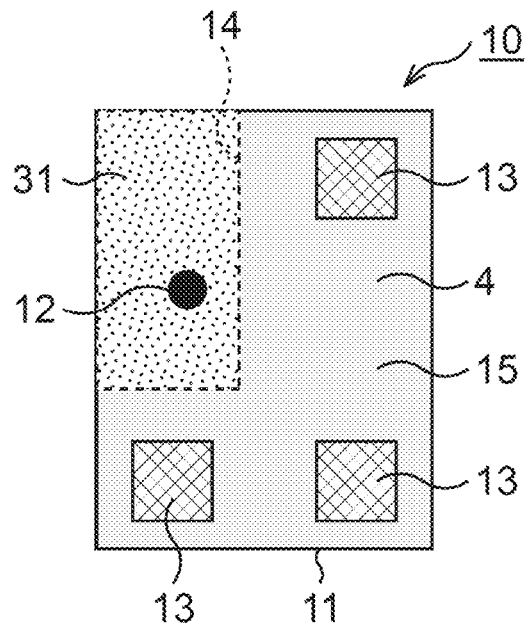
FIG. 10A and FIG. 10B are schematic plan views illustrating the method of manufacturing the optical unit according to the first embodiment.
Figure 10B:
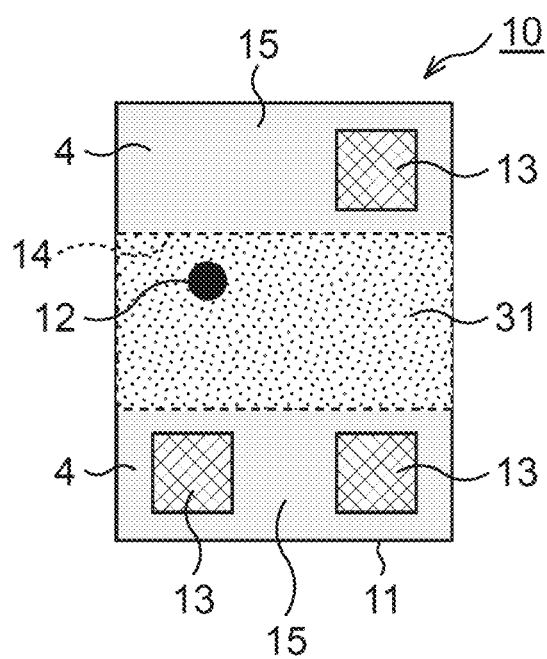

The underfill material 4 is added in a manner to duplicate the hydrophilic areas 15, 25. Here, the appearance of the optical part 10 to which the underfill material 4 is added in the first example of FIG. 6A is illustrated in FIG. 10A, and the appearance of the optical part 10 to which the underfill material 4 is added in the second example of FIG. 6B is illustrated in FIG. 10B. Further, the appearance of the optical parts 10 to which the underfill material 4 is added in the first example of FIG. 7A is illustrated in FIG. 11A, and the appearance of the optical parts 10 to which the underfill material 4 is added in the second example of FIG. 7B is illustrated in FIG. 11B.

In the first example illustrated in FIG. 10A, the underfill material 4 is added selectively in a substantially L shape to the hydrophilic area 15 excluding the hydrophobic area 14 in the optical part 10. The underfill material 4 is formed integrally in a substantially L-shaped island shape which sequentially covers the plurality of connecting electrodes 13. The gap 3 including the optical axis of the optical element 12 is formed in a partially opened rectangular open space.

In the second example illustrated in FIG. 10B, the underfill material 4 is added selectively to the hydrophilic areas 15 excluding the hydrophobic area 14 in the optical part 10. With respect to the plurality of connecting electrodes 13, the underfill material 4 is formed to be separated into an island-shaped region covering connecting electrodes 13 (two in the illustrated example) on a lower side, and an island-shaped region covering a connecting electrode 13 (one in the illustrated example) on an upper side. The gap 3 including the optical axis of the optical element 12 is formed in a partially opened rectangular open space.

In the first example illustrated in FIG. 11A, the underfill material 4 is added selectively in a substantially L shape to the hydrophilic area 15 excluding the hydrophobic area 14 in each optical part 10 on the longitudinally elongated base body 1 of Si for example. The underfill material 4 is formed integrally in a substantially L-shaped island shape which sequentially covers the plurality of connecting electrodes 13. The gap 3 including the optical axis of the optical element 12 is formed in a partially opened rectangular open space.

In the second example illustrated in FIG. 11B, the underfill material 4 is added selectively to the hydrophilic areas 15 excluding the hydrophobic area 14 on the longitudinally elongated base body 1 of Si for example in each optical part 10. With respect to the plurality of connecting electrodes 13, the underfill material 4 is formed to be separated into an island-shaped region covering connecting electrodes 13 (two in the illustrated example) on a lower side, and an island-shaped region covering a connecting electrode 13 (one in the illustrated example) on an upper side. Each gap 3 including the optical axis of the optical element 12 is formed in a partially opened rectangular open space. On the base body 1, individual gaps 3 are coupled to form a sequential gap in a strip form.

In this embodiment, by forming the desired hydrophobic areas 14, 24 and hydrophilic areas 15, 25 in advance, the hydrophilic underfill material 4 can be added in a self-aligned manner only to the hydrophilic areas 15, 25. By employing this structure, the formation position and shape of the gap 3 can be easily and accurately controlled in as small number of steps as possible, so as to form the gap 3 in a desired state.

Specifically, in the first examples illustrated in FIG. 10A and FIG. 11A, the underfill material 4 is added accurately in the substantially L shape to the optical part 10 and the base 20 so as to sequentially cover the plurality of connecting electrodes 13 and portions of the plurality of electrical wirings 23. Thus, the connecting electrodes 13 and the portions of the electrical wirings 23 are each securely covered by the underfill material 4, and thereby high joint reliability between the optical part 10 and the base 20 can be obtained. Moreover, the gap 3 can be formed in a partially opened open space, and there is no concern of thermal expansion of air in the gap 3.

Also in the second examples illustrated in FIG. 10B and FIG. 11B, on the optical part 10 and the base 20, the underfill material 4 is added accurately to a center region of the optical part 10. Thus, the connecting electrodes 13 and portions of the electrical wirings 23 are each covered by the underfill material 4, and thereby high joint reliability between the optical part 10 and the base 20 can be obtained. Moreover, the gap 3 can be formed in a partially opened open space, and there is no concern of thermal expansion of air in the gap 3.

As has been described above, according to this embodiment, the area to which the underfill material 4 is added can be controlled easily and accurately without using a high-precision jig or the like, and the gap 3 between the optical element 12 of the optical part 10 and the base 20 can be formed in a desired state. Thus, it becomes possible to ensure both low optical loss and electrode joint reliability, thereby realizing a highly reliable optical unit.

Second Embodiment

In this embodiment, similarly to the first embodiment, a structure of an optical unit will be described together with a method of manufacturing the same, but this embodiment differs from the first embodiment in that the method of forming a hydrophilic area is different.

FIG. 12A to FIG. 14 are schematic cross-sectional views illustrating main steps in the method of manufacturing an optical unit according to the second embodiment.

In this embodiment, first, the respective steps of FIG. 1A to FIG. 3B are executed similarly to the first embodiment.

Subsequently, on the surface of the optical part 10, the hydrophobic film 31 is left on a portion including the optical element 12 and thereabove.

Figure 12A:
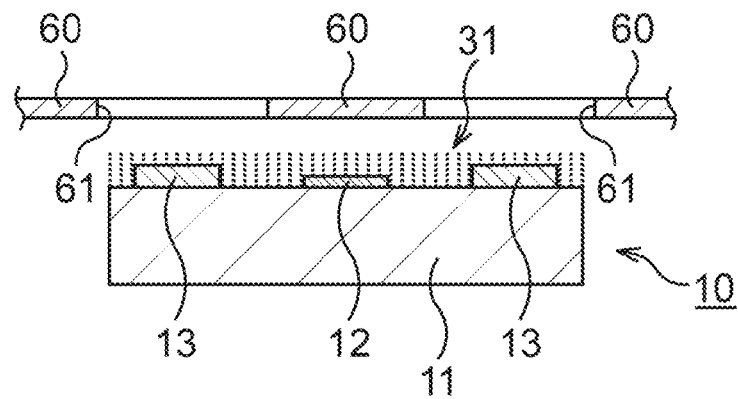
FIG. 12A to FIG. 12C are schematic cross-sectional views illustrating main steps in a method of manufacturing an optical unit according to a second embodiment.

More specifically, as illustrated in FIG. 12A, a photomask 60 having an opening 61 is prepared.

In the photomask 60, an opening 61 is formed in a substantially L shape. The photomask 60 is placed above the surface of the optical part 10. In the photomask 60, a portion including the plurality of connecting electrodes 13 of the optical part 10 and thereabove is exposed through the opening 61, and the portion including the optical element 12 and thereabove is in a state of being blocked by the photomask 60.

Figure 12B:
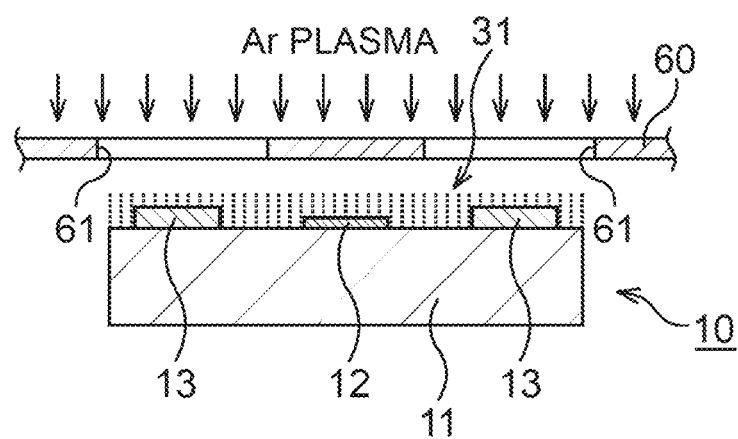

As illustrated in FIG. 12B, plasma is irradiated to the photomask 60.

More specifically, for example, Ar gas is supplied at the rate of 5 ml/min, and discharge is performed for 180 seconds at the output of 300 W. Thus, Ar plasma is irradiated to the portion including the plurality of connecting electrodes 13 and thereabove (portion in a substantially L shape in a plan view) via the opening 61. By irradiation of the Ar plasma, the octadecyl group, which is a hydrophobic group, is denatured to a hydrophilic group (SiOH) in the portion of the hydrophobic film 31 which includes the plurality of connecting electrodes 13 and thereabove.

Figure 12C:
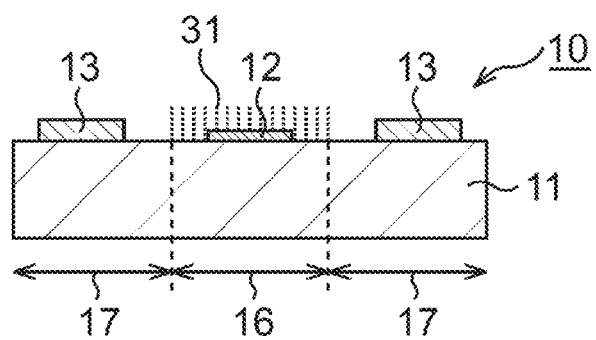

Thus, as illustrated in FIG. 12C, the hydrophobic film 31 is left on the portion including the optical element 12 and thereabove where the Ar plasma is blocked, thereby forming a hydrophobic area 16 as a first area. On the other hand, in a portion surrounding the hydrophobic area 16, that is, the portion including the connecting electrodes 13 and thereabove where the Ar plasma is irradiated, a hydrophilic area 17 is formed. The contact angle relative to water in the hydrophobic area 16 becomes 100° or more, thereby obtaining a sufficient hydrophobic property. The contact angle relative to water in the hydrophilic area 17 becomes 10° or less, thereby obtaining a sufficient hydrophilic property.

Subsequently, on the surface of the base 20, the hydrophobic film 32 is left in a portion including an optical axis to be made to face the optical element 12 and a portion above the electrical wirings 23.

Figure 13A:
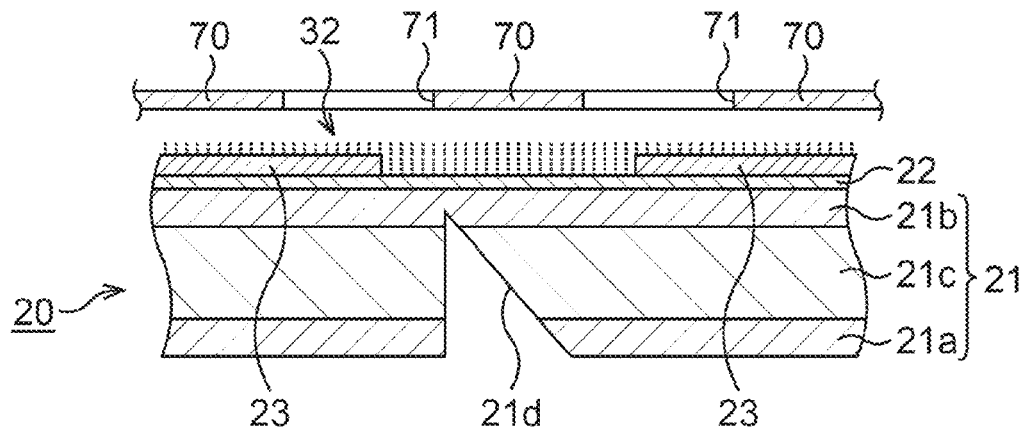
FIG. 13A to FIG. 13C are schematic cross-sectional views illustrating main steps in the method of manufacturing the optical unit according to the second embodiment.

More specifically, as illustrated in FIG. 13A, a photomask 70 having an opening 71 is prepared.

In the photomask 70, an opening 71 is formed in a substantially L shape. The photomask 70 is placed above the surface of the base 20. In the photomask 70, a portion including the plurality of electrical wirings 23 and thereabove is exposed through the opening 71, and the portion including the optical axis is in a state of being blocked by the photomask 70.

Figure 13B:
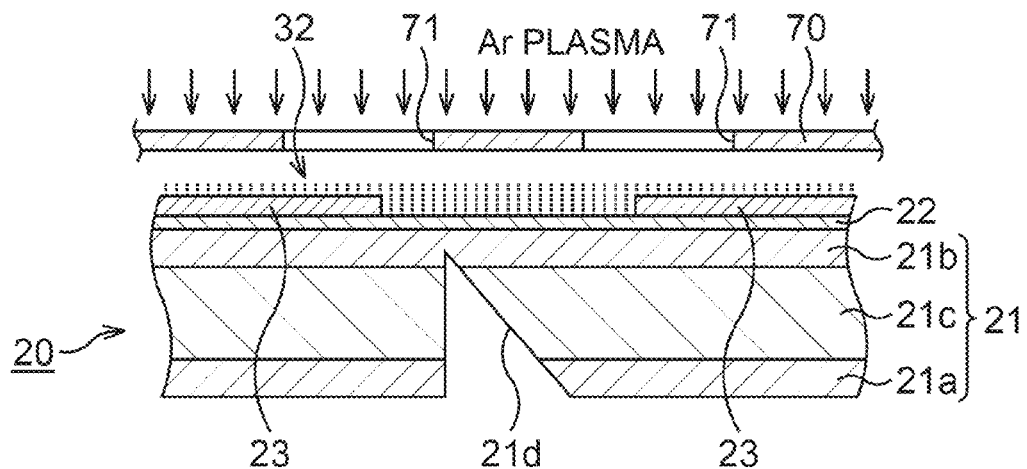

As illustrated in FIG. 13B, plasma is irradiated to the photomask 70.

More specifically, for example, Ar gas is supplied at the rate of 5 ml/min, and discharge is performed for 180 seconds at the output of 300 W. Thus, Ar plasma is irradiated to the portion above the plurality of electrical wirings 23 (portion in a substantially L shape in a plan view) via the opening 61. By irradiation of the Ar plasma, the octadecyl group, which is a hydrophobic group, is denatured to be a hydrophilic group (SiOH) in the portion of the hydrophobic film 32 above the plurality of electrical wirings 23.

Figure 13C:
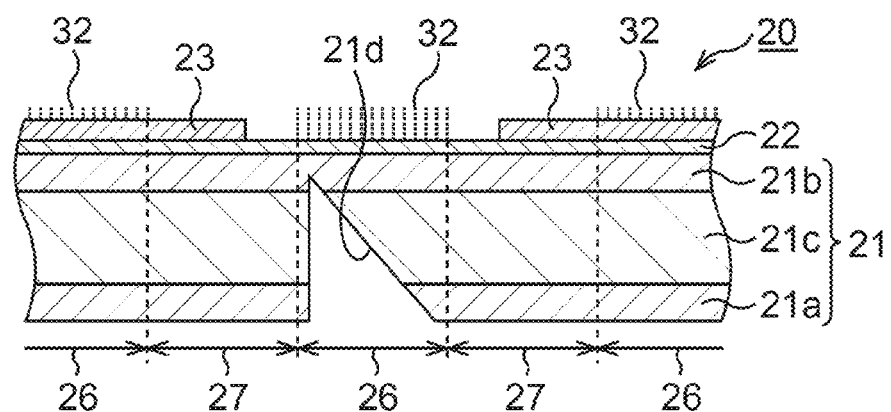

Thus, as illustrated in FIG. 13C, the hydrophobic film 32 is left on the portion including the optical axis where the Ar plasma is blocked and the other portion above the electrical wirings 23, thereby forming a hydrophobic area 26 as a second area. On the other hand, in a portion surrounding the hydrophobic area 26, that is, the portion above the electrical wirings 23 where the Ar plasma is irradiated, a hydrophilic area 27 is formed. The contact angle relative to water in the hydrophobic area 26 becomes 100° or more, thereby obtaining a sufficient hydrophobic property. The contact angle relative to water in the hydrophilic area 27 becomes 10° or less, thereby obtaining a sufficient hydrophilic property.

Figure 14:
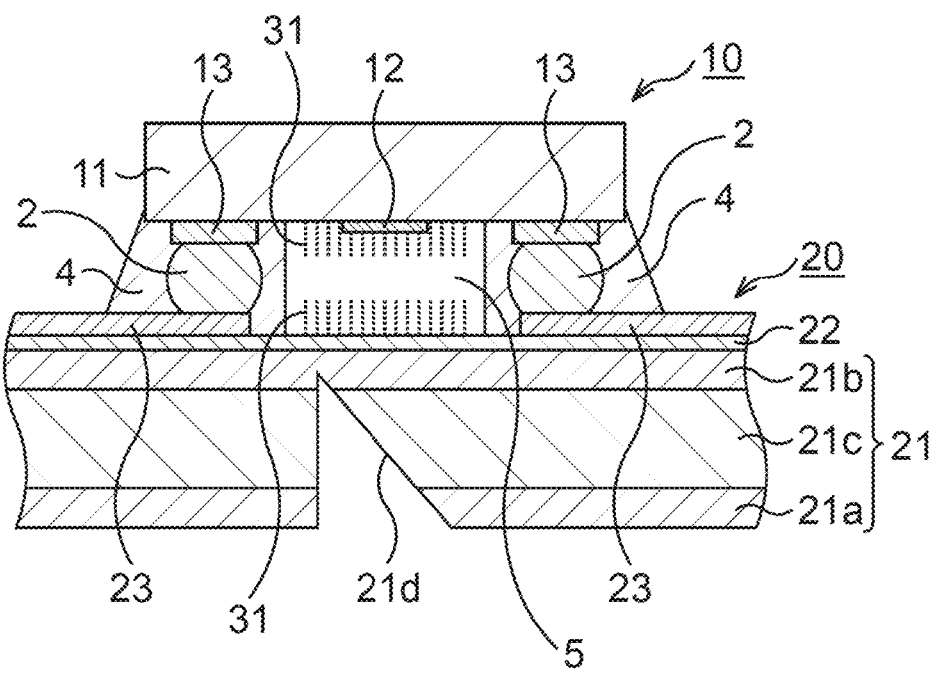
FIG. 14 is a schematic cross-sectional view illustrating a main step in the method of manufacturing the optical unit according to the second embodiment.

Thereafter, the respective steps of FIG. 8 and FIG. 9 are executed similarly to the first embodiment, and the underfill material 4 as a filler is added to the space between the optical part 10 and the base 20 which are joined as illustrated in FIG. 14. A gap 5 defined by the underfill material 4 is formed in a facing region between the hydrophobic area 14 and the hydrophobic area 24.

As has been described above, according to this embodiment, the area to which the underfill material 4 is added can be controlled easily and accurately without using a high-precision jig or the like, and the gap 5 between the optical element 12 of the optical part 10 and the base 20 can be formed in a desired state. Thus, it becomes possible to ensure both low optical loss and electrode joint reliability, thereby realizing a highly reliable optical unit.

According to the aspects described above, it becomes possible to easily and accurately control an area to which a filler is added, and form a gap between an optical part and a base in a desired state, so as to ensure both low optical loss and electrode joint reliability, thereby realizing a highly reliable optical unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical unit in which an optical part is mounted on a base having an optical waveguide, the optical unit comprising:
    a hydrophobic first area formed in a region including an optical axis of the optical part;
    a hydrophobic second area formed in a region facing the first area on a surface of the base; and
    a hydrophilic filler which fills a periphery of a third area having the first area and the second area which are formed so as to face each other, between the optical part and the base.

2. The optical unit according to claim 1, wherein the filler forms a gap of an open space in which the first area and the second area face each other.

3. The optical unit according to claim 2, wherein a plurality of first connecting parts of the optical part and a plurality of second connecting parts of the base are connected, and
    the filler is formed integrally in an island shape which covers the plurality of first connecting parts and portions of the plurality of second connecting parts.

4. The optical unit according to claim 1, wherein the first area and the second area are formed by adding a hydrophobic group to a surface of the optical part and a surface of the base.

5. The optical unit according to claim 1, wherein the optical part has, on a surface thereof, a contact angle of 100° or more relative to water in the first area, and has a contact angle of 10° or less relative to water in a non-formation region of the first area, and
    the base has, on a surface thereof, a contact angle of 100° or more relative to water in the second area, and has a contact angle of 10° or less relative to water in a non-formation region of the second area.

6. A method of manufacturing an optical unit in which an optical part is mounted on a base having an optical waveguide, the method comprising:
    forming a hydrophobic first area in a region including an optical axis of the optical part and a hydrophobic second area in a region facing the first area on a surface of the base;
    mounting the optical part on the base so as to form a third area by facing the first area to the second area face; and
    filling a periphery of the third area between the optical part and the base with a hydrophilic filler.

7. The method of manufacturing the optical unit according to claim 6, wherein the filler forms a gap of an open space in which the first area and the second area face each other.

8. The method of manufacturing the optical unit according to claim 7, further comprising:
    connecting a plurality of first connecting parts of the optical part and a plurality of second connecting parts of the base,
    wherein the filler is formed integrally in an island shape which covers the plurality of first connecting parts and portions of the plurality of second connecting parts.

9. The method of manufacturing the optical unit according to claim 6, wherein the first area and the second area are formed by adding a hydrophobic group to a surface of the optical part and a surface of the base.

10. The method of manufacturing the optical unit according to claim 9, wherein the formation of the first area and the second area comprises:
    dipping the optical part and the base in a hydrophobic solution to add a hydrophobic group to the surface of the optical part and the surface of the base; and
    transforming each of the hydrophobic group on a periphery of the first area on the surface of the optical part and the hydrophobic group on a periphery of the second area on the surface of the base into a hydrophilic group.

11. The method of manufacturing the optical unit according to claim 10, wherein in the transformation into the hydrophilic group, ultraviolet light is irradiated to the hydrophobic group.

12. The method of manufacturing the optical unit according to claim 10, wherein in the transformation into the hydrophilic group, plasma is irradiated to the hydrophobic group.

13. The method of manufacturing the optical unit according to claim 6, wherein the optical part has, on a surface thereof, a contact angle of 100° or more relative to water in the first area, and has a contact angle of 10° or less relative to water in a non-formation region of the first area, and
    the base has, on a surface thereof, a contact angle of 100° or more relative to water in the second area, and has a contact angle of 10° or less relative to water in a non-formation region of the second area.

* * * * *